Aug. 10, 1954     T. RIANDA     2,685,832
BLADE FOR MECHANICAL BLOCKERS OR THINNERS
Filed Aug. 27, 1952
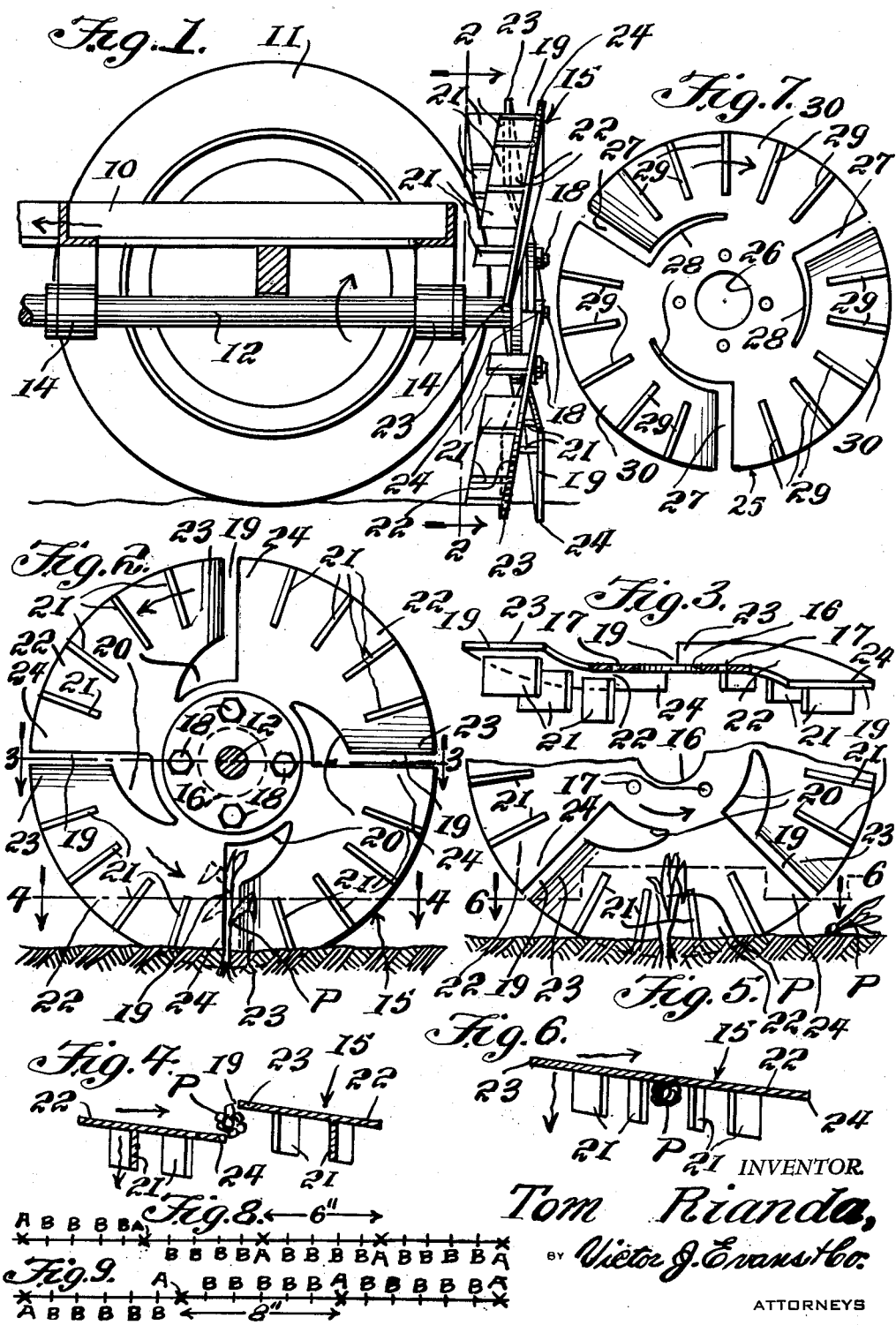
INVENTOR.
Tom Rianda,
BY Victor J. Evans & Co.
ATTORNEYS Patented Aug. 10, 1954

2,685,832

UNITED STATES PATENT OFFICE 2,685,832

BLADE FOR MECHANICAL BLOCKERS
OR THINNERS

Tom Rianda, Gonzales, Calif.

Application August 27, 1952, Serial No. 306,546

1 Claim. (Cl. 97—213)

This invention relates to agricultural equipment, and more particularly to a mechanical blade for a blocker or thinner.

The object of the invention is to provide a rotary blade or disk which is adapted to be mounted on and rotated by a suitable machine such as a tractor, the blade of the present invention being constructed so that a predetermined number of plants are thinned or blocked out upon rotation of the blade or disk.

Another object of the invention is to provide a rotary blade or disk which has a plurality of spaced fins secured thereto whereby upon rotation of the disk a certain number of growing plants will be blocked out or thinned out so that the remaining plants will have sufficient space therebetween to insure that the plants can grow properly.

A further object of the invention is to provide a thinning or blocking blade which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a sectional view taken through a farm implement such as a tractor, showing the blade of the present invention mounted thereon.

Figure 2 is a sectional view taken on the line 2—2 of Figure 1.

Figure 3 is a sectional view taken on the line 3—3 of Figure 2 showing the blocking disk only.

Figure 4 is a sectional view taken on the line 4—4 of Figure 2.

Figure 5 is a view similar to Figure 2, but showing a plant passing through one of the openings or slots in the disk.

Figure 6 is a sectional view taken on the line 6—6 of Figure 5.

Figure 7 is a view similar to Figure 2, but showing a modified disk or blade.

Figure 8 is a diagrammatic view showing the thinning out accomplished by the blade shown in Figure 2.

Figure 9 is a view similar to Figure 8, but showing the thinning out accomplished by the blade of Figure 7.

Referring in detail to the drawings, the numeral 10 designates a frame which may be the frame of a tractor or other farm implement, and the frame 10 may be supported on the usual wheels 11, Figure 1. A horizontally disposed shaft 12 may be supported in bearings 14 which depend from the frame 10, and the shaft 12 may have its front end connected to any suitable power source.

The present invention is directed to a thinning or blocking blade or disk 15, and one or two of the blades 15 may be used simultaneously. Each of the blades 15 is circular in shape and is provided with a central opening 16 for receiving the rear end of the shaft 12. Arranged in spaced relation about the opening 16 is a plurality of holes or apertures 17 whereby suitable securing elements such as bolt and nut assemblies 18 can project through the openings 17 for securing the blade 15 to a flange on the shaft 12. Thus, as the shaft 12 rotates, the blade 15 will be rotated.

The blade 15, shown in Figures 1 through 6, is provided with four spaced slots 19, and each of the slots 19 terminates in a cut-out 20. The slots 19 define therebetween in the blade 15 four body portions 22. Secured to the blade 15 on one side thereof only adjacent the outer periphery thereof is a plurality of spaced fins 21. Thus, as the blade 15 is rotated the fins 21 will engage certain of the standing plants P to remove a predetermined number of the growing plants P from the ground and cast them to one side as shown in Figure 5.

The portion of the blade adjacent one side of the slots 19 extend outwardly with respect to a central plane passing through the major axis of the blade, and the outwardly extending portion of each of the body sections 22 is indicated by the numeral 24. The other end of each of the body portions 22 extends inwardly as at 23, and this construction is best seen in Figure 4. By having one end of each of the body portions 22 extending outwardly as at 24 and the other end of each of the body portions 22 extending inwardly as at 23, it will be seen that the slot 19 will be of sufficient size to permit the passage therethrough of the plants P which are to be left growing or standing.

Referring to Figure 7 there is shown a modified blade which is indicated by the numeral 25, and the blade 25 is provided with a central opening 26 for receiving the rear end of a shaft such as the shaft 12. The blade 25 is provided with three slots 27 which each terminate in an inner cut-out 28. It will be noted that the blade 25 has only three slots 27 while the previously described blade 15 has four slots 24. The slots 27 define therebetween three body portions 30, and arranged at right angles with respect to each of the body portions 30 and secured thereto is five fins 29. One end of each of the body portions 30 extends inwardly while its other end extends outwardly as previously described.

Referring to Figure 8 there is shown a diagrammatic view illustrating the method of use of the disk or blade 15. Thus, the letters A indicate those plants left standing, while the letters B designate those plants which are removed by the fins 21 during the rotation of the blade. It will be seen in Figure 8 that for each two feet of forward travel of the tractor, there will be one revolution of the blade 15 and since there are four fins 21 in each of the sections 22, then for each revolution of the blade four plants P will be left standing. Also, the plants P left standing will be spaced six inches apart, as shown in Figure 8, the space between the letters A which represent the standing plants being six inches.

In Figure 9 there is shown a diagrammatic view illustrating the use of the blade 25 of Figure 7. Since the blade 25 has only three slots 27, there will be five plants removed for every plant left growing. Again the blade 25 will make one revolution for every two feet of forward travel of the tractor, and the standing plants designated by the letter A will be spaced eight inches apart. As the blade 25 rotates, there will be five plants blocked out or thinned out by the fins 29.

From the foregoing, it is apparent that an improved blade or disk has been provided for automatically blocking out or thinning out a predetermined number of growing plants. The blades 15 and 25 may be used either singly or together on the back of a tractor or other implement, and when the blades are used together they rotate in opposite directions with respect to each other so that the plants P which have been scooped out of the ground by the fins 21 and 29 will be deposited alongside the tractor as shown in Figure 5. When the blade 15 is being used there will be six inches left between each growing plant A since four of the slots 19 are provided on the blade. With the blade 25 of Figure 7 being used, there will be eight inches between each plant A left standing since there are only three of the slots 27 for the plants which are to remain standing to pass through. The above calculations are based upon the assumption that the blades 15 and 25 make one revolution for every two feet of forward movement of the tractor.

When the disks or blades are being used together one rotates in a clockwise direction while the other rotates in a counterclockwise direction. The size of the parts and the speed of rotation of the blades can be varied as desired. If desired more than two of the blades may be mounted on a single tractor, as for example four of the blades may be mounted on a single implement or tractor so that four rows of vegetables or plants will be thinned out at one time. The present invention is especially suitable for cutting out or thinning a stand of vegetables after the vegetables have sprouted and a good stand is assured. By the use of the present invention the plants will be spaced the desired distance apart in the row to assure a normal growth and to insure that the plants will not crowd each other for root space or above ground. As previously described, the back edge of each of the sections 22 is offset from the front edge so that as the blades are moved down the row, the blades or disks will be constantly revolving and the fins will cut or scoop a predetermined number of plants from the ground. When a plant engages the slot 19 or the slot 27 that particular plant will be left standing, and the fins are arranged so that all of the dirt and plants which are scooped or cut are laid to one side of the row to thereby leave a clean cut block where the open space passed. The number of fins can be varied as desired, and the fins may be welded on at right angles to the blade. The shaft 12 may be a differential shaft of a tractor. Also, the fins have a shaving effect instead of a hoeing action and do not disturb any unnecessary dirt.

I claim:

In a plant thinning blade, a horizontally disposed drive shaft having an annular flange on its rear end, there being a central opening in said blade for receiving the rear end of said shaft, said blade having a plurality of apertures in spaced relation around said opening, securing elements extending through said apertures and through said flange, said blade being provided with a plurality of spaced slots, said blade being circular in shape, the inner ends of said slots terminating in cutouts, said cutouts extending angularly from said slots, and said cutouts being arcuately shaped, and the portion of the cutouts communicating with the slots being larger than the inner end portions of the cutouts, said slots defining body portions therebetween, the ends of said body portions being offset in opposite directions with respect to each other whereby one end of each of said body portions is arranged inwardly of a central plane passing through the blade and the other end of each body portion is arranged outwardly of the central plane, and a plurality of radially extending fins spacedly mounted on the outer periphery of each body portion and secured at right angles thereto, each body portion having an equal number of fins secured thereto, said fins being positioned on one side only of the blade, the outer ends of the fins being flush with the outer periphery of said blade, and the inner ends of said fins being spaced outwardly of said cutouts, said slots and cutouts permitting the passage therethrough of the plants which are to be left standing, and said fins engaging the plants to be removed from the ground.

References Cited in the file of this patent

UNITED STATES PATENTS

| Number | Name | Date |
|---|---|---|
| 711,417 | Castles | Oct. 14, 1902 |
| 716,696 | Foster | Dec. 23, 1902 |
| 959,031 | Simmons | May 24, 1910 |
| 2,599,843 | Knutzen | June 10, 1952 |

FOREIGN PATENTS

| Number | Country | Date |
|---|---|---|
| 6,914 | Great Britain | May 8, 1915 |
| 877,890 | France | Oct. 3, 1941 |